United States Patent [19]

Thoulon

[11] Patent Number: 5,530,719
[45] Date of Patent: Jun. 25, 1996

[54] METHOD AND A CIRCUIT FOR IDENTIFYING THE NOMINAL FREQUENCY OF A LOGIC SIGNAL THROUGH USE OF TRAINS OF CLOCK PULSES HAVING RESPECTIVE PREDETERMINED TIME DURATIONS

[75] Inventor: Pierre-Yves Thoulon, Voreppe, France

[73] Assignee: Hewlett-Packard Company, Palo Alto, Calif.

[21] Appl. No.: 170,042

[22] Filed: Dec. 17, 1993

[30] Foreign Application Priority Data

Dec. 28, 1992 [FR] France .................................. 92 16021

[51] Int. Cl.$^6$ .............................. H04B 3/46; H04L 25/38
[52] U.S. Cl. .......................................... 375/224; 375/369
[58] Field of Search ..................................... 375/224, 369, 375/370, 362, 225

[56] References Cited

U.S. PATENT DOCUMENTS 4,760,536   7/1988   Curtis ....................................... 364/484

5,157,651   10/1992   Ghelberg et al. ......................... 375/224

FOREIGN PATENT DOCUMENTS 2184306   6/1987   United Kingdom.
WO92/02085   2/1992   WIPO.

OTHER PUBLICATIONS

International Search Report 20 Sep. 1993 of French Appl. No. 9216021

*Primary Examiner*—Edward L. Coles, Sr.
*Assistant Examiner*—Allan A. Esposo

[57] ABSTRACT

A method is provided for identifying the frequency of a logic signal that may have a frequency equal to one of n discrete frequencies. The method includes the steps of sequentially transmitting trains of clock pulses of decreasing frequencies. Each clock frequency is a constant multiple of one of the discrete frequencies. The time duration of the first train of clock pulses corresponds to the measurement time duration of a logic signal at the first discrete frequency. The time duration of the $i^{th}$ train of pulses is such that the sum of the time durations of the first to the $i^{th}$ pulse trains corresponds to the measurement time duration of a logic signal at the $i^{th}$ discrete frequency.

5 Claims, 5 Drawing Sheets

METHOD AND A CIRCUIT FOR IDENTIFYING THE NOMINAL FREQUENCY OF A LOGIC SIGNAL THROUGH USE OF TRAINS OF CLOCK PULSES HAVING RESPECTIVE PREDETERMINED TIME DURATIONS

FIELD OF THE INVENTION

The present invention relates to the identification of the nominal frequency of a logic signal expected to have a frequency substantially equal to any one of a plurality of discrete nominal frequencies. In particular, but not exclusively, the present invention relates to the detection of the transmission speed of an apparatus connected to a serial line.

BACKGROUND ART

In modern data processing systems including terminals connected to a server through serial lines, the serial interface circuits of the server, commonly referred to as Universal Asynchronous Receiver Transmitter (UART) may be automatically adapted to the various possible transmission speeds of the terminals. Upon initial connection of a terminal with a server, a user presses a specific key of the terminal, generally the "carriage return" (CR) key one or more times, to enable the server to detect the transmission speed and adapt, or reprogram, its associated UART circuit.

FIG. 1 represents a series of states of a serial line during the sending of a "CR" character encoded according to ASCII standard. Initially, in stand-by state, the serial line is at 1. At the beginning of the transmission of the character, the serial line goes to 0 during the transmission time of one bit. This initial bit at 0 is referred to as a START bit: and systematically indicates the beginning of transmission. Then, seven character code bits occur in order of increasing weight. For a "CR" character, these bits are 1011000. The eighth bit P transmitted after the START bit is, according to the transmission protocol, either an eighth, most-significant, bit of the transmitted character (at 0 for the "CR" key) or a parity bit that is set to 1 or 0 so that the number of transmitted bits at 1 is even (this bit is at 1 for the "CR" key). The last transmitted bit, STOP, is systematically at 1 and signals the end of transmission.

The intervals at 1 or at 0 associated with each transmitted bit are of the same length the value of which depends upon the transmission speed. For conventional serial transmission, a transmission speed is chosen from a plurality of standard speeds that are, for example, 75 bits/second and double speeds up to 38400 bits/second, or 57600 bits/second and double speeds up to, for example, 921600 bits/second. The speeds exceeding 57600 bits/second or the speeds below 38400 bits/second have a geometric progression (with a multiplying factor 2). Each speed is a nominal speed corresponding to a nominal time duration of the transmitted bits. The effective time duration of a bit may vary within a range up to ±33% of the nominal time duration, while the nominal speed variation does not exceed 2%.

A conventional method for detecting transmission speed consists in measuring at the server the width of the START bit, reprogramming the UART to the detected speed during the transmission of the second bit, acquiring the eight following bits (011000,P, STOP), and checking whether these bits are the right ones. A failure during this verification indicates either the character transmitted was not correct (was not the "CR" key) or the measurement of the START bit failed (for example because this bit was distorted, or measurement started too late). In this case, the system waits for the issuing of a new character "CR" on the line.

Conventionally, to determine the length of a time interval (or of a bit), the number of pulses of a fixed frequency clock occurring within the time interval to be measured is counted. The counted number of pulses provides a direct indication of the interval length. However, for identifying a nominal frequency amongst several possible nominal frequencies, this counted number cannot be directly used because it is further necessary to determine the nominal frequency to which this number corresponds. For this purpose, once the number has been counted, it has to be successively compared with a plurality of minimum and maximum values, where each pair of minimum and maximum values corresponds to an error range about a nominal value.

A drawback of such a method is that two limit values for each possible nominal frequency have to be memorized, which requires twice as many memory cells as nominal frequencies. Additionally, if the number of nominal frequencies is large, the limit values associated with the lowest nominal frequency are high and require a large-size memory cell. Indeed, for example, if 16 clock pulses in a bit are counted at the speed of 38400 bits/second, then 4096 clock pulses are counted in a bit at the speed of 75 bits/second. Number 4096 requires 12 bits to be stored whereas number 16 only needs 4 bits.

The simplest and least expensive conventional way of implementing the above method is to carry out its steps using software, this software generally being executed by a microprocessor of the server that monitors the serial connections. However, the limited speed of execution of the program does not allow the detection of high speeds and/or does not allow a suitable determination to be made of the transmission speeds, if a large number of serial connections are simultaneously used. If it is desired to adequately manage a large number of serial connections and/or to increase the speed of these serial connections whilst using this approach, the number of microprocessors assigned to the connections has to be significantly increased which is expensive.

SUMMARY OF THE INVENTION

An object of the invention is to provide a method for identifying the nominal frequency of a signal whose frequency may be substantially equal to one of a plurality of nominal frequencies, the method being particularly simple to implement in hardware.

Another object of the invention is to provide a circuit implementing the above-described method and capable of rapidly identifying the nominal frequency of the signal.

A further object of the invention is to provide a transmission/reception circuit that is self-adapting to the transmission speed of a serial line, and is capable of processing particularly high transmission speeds.

To achieve these objects, the invention envisages the successive transmission of trains of clock pulses starting from a first predetermined edge (for example, a falling edge) of a signal to be measured, and continuing for a time interval comprised between the first edge and a second predetermined edge of the signal to be measured, the trains of clock pulses each having a respective predetermined time duration with the first train being at a frequency corresponding to the highest possible nominal frequency, and the last train corresponding to the lowest nominal frequency. The time durations of these trains are calculated beforehand so that, if the signal to be measured is at the $n^{th}$ nominal frequency from the highest nominal frequency, it is the $n^{th}$ train of clock pulses that is being transmitted when the second edge occurs. Of course, for each clock pulse train, the time duration is calculated so as to take into account the possible period variation of the signal to be measured about each nominal period.

More formally stated, according to one aspect of the present invention, there is provided a method of identifying the nominal frequency Of a logic signal that may have a frequency equal, with a possible error, to one of n discrete frequencies of progressively decreasing value from the first to the $n^{th}$ frequency, said possible error having, for each said discrete frequency, a predetermined allowable range defined by maximum positive and negative error values, said method being implemented during a measurement period established by two predetermined edges of the logic signal (Rx), and including the following steps:

a) to the extent permitted by the duration of said measurement period, sequentially transmitting trains of clock pulses with each successive clock pulse train being of a lesser frequency than its predecessor and having a respective predetermined time duration, said predetermined time durations of the clock pulse trains being such that:

(i) the total duration of the pulse trains from the first to the $i^{th}$ pulse train, for $0<i<n$, is at least as great as the duration of the measurement period that would result in the case of the logic signal having the $i^{th}$ discrete frequencies decreased by the corresponding maximum negative error value, but is less than the duration of the measurement period than would result in the case of the logic signal having the $(i+1)^{th}$ discrete frequency increased by the corresponding maximum positive error value, (ii) the total duration of the pulse trains from the first to the $n^{th}$ pulse trains is at least as great as the duration of the measurement period that would result in the case of the logic signal having the $n^{th}$ discrete frequency decreased by the corresponding maximum positive error value, b) at the occurrence of the second of predetermined said edges, taking an indication of the then current clock frequency as an indication of the nominal frequency of the logic signal.

Preferably, the time durations of said clock pulse trains are such that the sum of the time durations of the first to the $i^{th}$ trains of clock pulse trains, for $0<i\leq n$, is substantiality equal to the duration of the measurement period that would result in the case of the logic signal having a frequency equal to the $i^{th}$ discrete frequency decreased by the corresponding maximum negative error value.

Advantageously, the method further includes the step of indicating that the nominal frequency of the logic signal is unknown if the second of said edges does not occur before the end of the transmission of $n^{th}$ clock pulse train. Alternatively or additionally, the method may include the step of indicating that the nominal frequency of the logic signal is unknown if, when the second of said edges occurs during the $i^{th}$ pulse train, for $0<i\leq n$, the duration of the actual measurement period is less than the duration of the measurement period that would result in the case of the logic signal having a frequency equal to the $i^{th}$ discrete frequency increased by the corresponding maximum positive error value.

Preferably, the ratio of the value of the $i^{th}$ discrete frequency to the frequency value of the $i^{th}$ clock pulse train is the same for all values of i for $0<i\leq n$.

According to another aspect of the present invention, there is provided a frequency-identifying circuit for identifying the instantaneous nominal frequency of a logic signal that may have an instantaneous frequency equal, with a possible error, to one of a plurality of discrete nominal frequencies, said circuit comprising:

a clock generator for providing a plurality of clock signals, each clock signal having a frequency that is a constant multiple of an associated said discrete frequency;

a sequencer for providing a start signal at the occurrence of a first predetermined edge of the logic signal, and a stop signal at the occurrence of a second predetermined edge of the logic signal;

a first counter for containing selection data whose successive values are associated with respective clock signals of successively decreasing frequencies and thus with respective said discrete frequency of successively decreasing value;

a multiplexer connected to said clock generator and controlled by the selection data to provide the associated clock signal;

a second counter for receiving at a counting input the output of the multiplexer;

a comparator for providing an enabling signal when the content of the second counter reaches a maximum value selected in dependence on the selection data; and a control circuit for providing initialization signals to the first and second counters as soon as it receives said start signal, and for providing a count enable signal to the first counter and an initialization signal to the second counter when said enabling signal is provided by the comparator, the control circuit going into stand-by state when it receives said stop signal. Preferably, said maximum value selected in dependence on the selection data corresponds to the value that would have been reached by the second counter on the occurence of said second predetermined edge of the logic signal in the case of the latter having the discrete frequency associated with the present selection data, decreased by a maximum allowable error.

Advantageously, the comparator provides an unidentified-frequency signal indicating that the frequency of the logic signal does not correspond to a said discrete nominal frequency, when one of the following occurs:

the selection data reaches a value beyond that associated with the lowest said discrete nominal frequency, the content of the second counter is lower than a minimum value corresponding to the value that would have been reached by the second counter on the occurrence of said second predetermined edge of the logic signal in the case of the latter having the discrete frequency associated with the present selection data, increased by a maximum allowable error.

Preferably, said maximum and minimum values corresponding to the values of the selection data are stored in respective memories addressed by the selection data, the value provided by each memory being compared with the output of the second counter in a respective comparator.

In yet another aspect, the present invention provides a circuit self-adaptive to the transmission speed of an apparatus connected to a serial line on which the apparatus transmits a predetermined character for the detection of the transmission speed, including:

the frequency-identifying circuit as set forth above;

a Universal Asynchronous Receiver Transmitter (UART) that is connected to said serial line and clocked by the clock signal provided by the multiplexer of the identification circuit; and a check circuit for providing a correct-character signal if the character received by the UART is equal to the predetermined character;

the said sequencer of the frequency-identifying circuit being connected to the serial line for providing said start signal on the occurrence of a first edge on the serial line, corresponding to the first bit of the predetermined character, and for providing said stop signal on the occurrence of a second edge on the serial line, corresponding to a predetermined subsequent bit of said predetermined character, the sequencer being further operative to provide a further start signal to the UART when said unidentified-frequency signal is absent following the occurrence of said stop signal, and to maintain unchanged the clock signal provided to the UART when the correct-character signal is provided by the check circuit at the end of the transmission of said predetermined character.

An advantage of the present invention, inherent in the method according to the invention, is that it is particularly simple to implement using logic circuits, Another advantage attainable with embodiments of the present invention is that the minimum and maximum values associated with each nominal frequency are substantially equal and require a constant and small-size memory cell for the storage thereof. If the successive nominal frequencies are in geometric progression, the minimum or maximum values are equal starting from the second train of clock pulses.

Another advantage that can be achieved with particular embodiments of the present invention is that the clock frequency can be directly used by a UART that has to be synchronized with the nominal frequency of the signal to be measured.

A further advantage of the present invention is that the identification of the desired nominal frequency can generally be carried out at the very moment when the second edge occurs, and not following subsequent comparison operations as in a conventional system; this enables the time needed for frequency identification to be decreased.

BRIEF DESCRIPTION OF THE DRAWINGS

A frequency-identification method according to the invention, and a frequency-identification circuit embodying the invention, will now be particularly described, by way of non-limiting example, with reference to the accompanying diagrammatic drawings, in which.

BEST MODE FOR CARRYING OUT THE INVENTION

Figure 2:
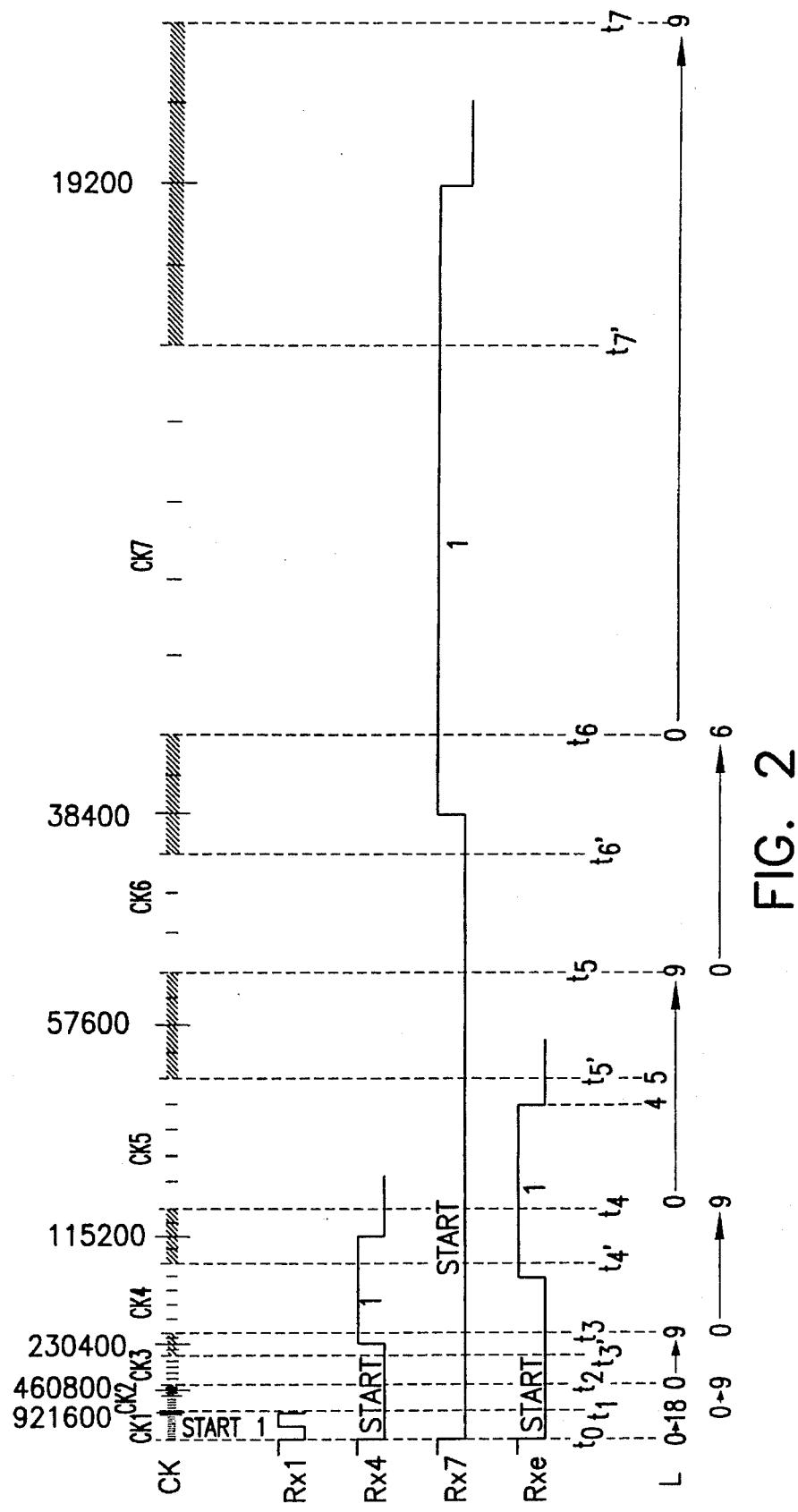
FIG. 2 represents an exemplary clock signal during the execution of the method according to the invention for identifying the nominal frequency of a logic signal.

FIG. 2 illustrates exemplary steps of the frequency-identification method to be described for the identification of the nominal frequency of a logic signal Rx that may have any one of a plurality of discrete nominal frequencies. In FIG. 2, such discrete nominal frequencies correspond to standard speeds of transmission on a serial line up to 921600 bits/second.

In the following description, terms such as "nominal speed", "standard speed" and "nominal frequency" will be used interchangeably. Since the method to be described is applied to only one or several half-periods of a signal, the term "frequency" designates more precisely an instantaneous frequency calculated from the considered half-periods.

The identification method is initialized at time t0 corresponding to the start of a specific measurement interval of a signal Rx whose frequency is to be identified. This measurement interval is defined by two predetermined edges corresponding to one or several half-periods of signal Rx. In FIG. 2, it is assumed that the measurement interval corresponds to the first two bits (START and 1) of the transmission signal of an identification character such as the CR character.

Between time $t_0$ and subsequent successive times $t_1$, $t_2$ . . . $t_i$ . . . $t_n$, trains of clock pulses CK1, CK2 . . . $CK_i$ . . . $CK_n$ are transmitted. Clock pulses CK are indicated in FIG. 2 by vertical lines. Each pulse train is associated with one of the nominal speeds. The first pulse train, CK1, is associated with the maximum selected speed (921600 bits/second) and the last pulse train, $CK_n$, is associated with the lowest speed for example, 75 bits/second.

The ratios between each nominal frequency and the frequency of the associated pulse train are equal. Thus, as shown in FIG. 2, the frequencies of the successive pulse trains decrease by the same ratio as the successive standard speeds.

Times $t_1$, $t_2$ . . . are selected so that the end of the measurement interval of a signal Rxi at the $i^{th}$ nominal frequency (i=1, 2 . . . ) is provided while the $i^{th}$ pulse train is being transmitted. At the very end of the measurement interval, the rank of the pulse train that is being transmitted is taken as an indication of the desired nominal frequency.

FIG. 2 shows, by way of example, signals Rx1, Rx4, and Rx7 to be measured. The measurement intervals of signals Rx1, Rx4, and Rx7, at the respective speeds of 921600, 115200, and 19200 bits/second, end before times $t_1$, $t_4$, and $t_7$, respectively. The pulse trains that are being transmitted are respectively the first, fourth and seventh pulse trains, which indicates that the desired nominal speeds are respectively the first (921600), the fourth (115200) and the seventh (19200).

The time duration of a bit transmitted by a signal Rxi may vary about its nominal value; hence, the measurement interval is permitted to exceed its nominal value, up to a maximum tolerable value, before the next pulse train is transmitted. Times $t_i$ correspond exactly to these maximum values. Thus, if a measurement interval exceeds a time $t_i$, it can be assumed that the speed of the signal to be measured is one of the speeds with a rank higher than i or that the signal of interest is an erroneous signal.

The case of such an erroneous signal is illustrated by signal Rxe. The measurement interval of signal Rxe ends between times $t_4$ and $t_5$. Its nominal speed would be indicated as being the fifth (57600) speed. However, as can be seen in FIG. 2, the speed of signal Rxe significantly differs from 57600, and is anyway outside a tolerable error range of about 57600 bits/second. Hatched areas represent ranges of tolerable error about each one of the nominal speeds. The range associated with the $i^{th}$ nominal speed ends at time $t_i$ and starts at a time $t_{i'}$. For the sake of simplification, references $t_1'$ and $t_2'$ are not shown in FIG. 2. The error range associated with the $i^{th}$ speed substantially corresponds to a variation about the $i^{th}$ speed by ±25% of the difference separating the ith speed from the $i-1^{th}$ speed.

Another step of the frequency-identification method consists in detecting, at the time when a measurement interval ends, whether the signal is within one of the tolerable error ranges. This requirement is met for signals Rx1, Rx2, and Rx7, but is not met for signal Rxe whose measurement interval ends between times $t_4$ and $t_5'$. Hereinafter, it will be seen in more detail how to detect whether or not a signal falls within an error range.

Additionally, if the measurement interval does not end before time $t_n$ associated with the lowest possible nominal speed, the speed of the measured signal is indicated as being unknown.

The frequency-identification method can be implemented in a simple way by using a counter that, for each clock pulse train, counts the clock pulses $CK_i$, that is, a counter that is reset at each of times $t_i-1$. The values counted by the counter are labeled L in FIG. 2.

In the example of FIG. 2, it is assumed that the clock frequency associated with the $i^{th}$ nominal speed is such that the measurement interval of a signal at the $i^{th}$ nominal speed is equal to 16 times the clock period. In this case, for the trains of clock pulses CK2–CK5 and CK7 and over, whose frequency is twice the immediately lower frequency, a nominal measurement duration, that is, the measurement duration of a logic signal at one of the nominal frequencies, corresponds to the counting of 7 clock pulses. The minimum measurement duration, that is, the nominal duration with a maximum negative error, corresponds to the counting of 5 clock pulses. The maximum measurement duration, that is, the nominal duration with a maximum positive error, corresponds to the counting of 9 clock pulses.

For the first clock pulse train CK1, the nominal measurement duration corresponds to the counting of 16 clock pulses; the minimum measurement duration corresponds to the counting of 14 clock pulses and the maximum duration corresponds to the counting of 18 clock pulses.

For the sixth clock pulse train CK6, whose frequency is not half the frequency of the preceding pulse train CKS, the nominal measurement duration corresponds to the counting of 4 clock pulses, the maximum measurement duration corresponds to the counting of 6 clock pulses, and the minimum measurement duration to the counting of 3 clock pulses.

To check the validity of the nominal speed indicated at the end of a measurement interval, the state of the counter is read and a check is made as to whether the latter is higher than the minimum value associated with the nominal speed that is indicated. For signal Rxe, the state of the counter is 4 at the end of the measurement interval whereas it should be higher than 5; this situation indicates that the speed of signal Rxe is unknown, and therefore that the indicated speed is not valid.

Figure 3:
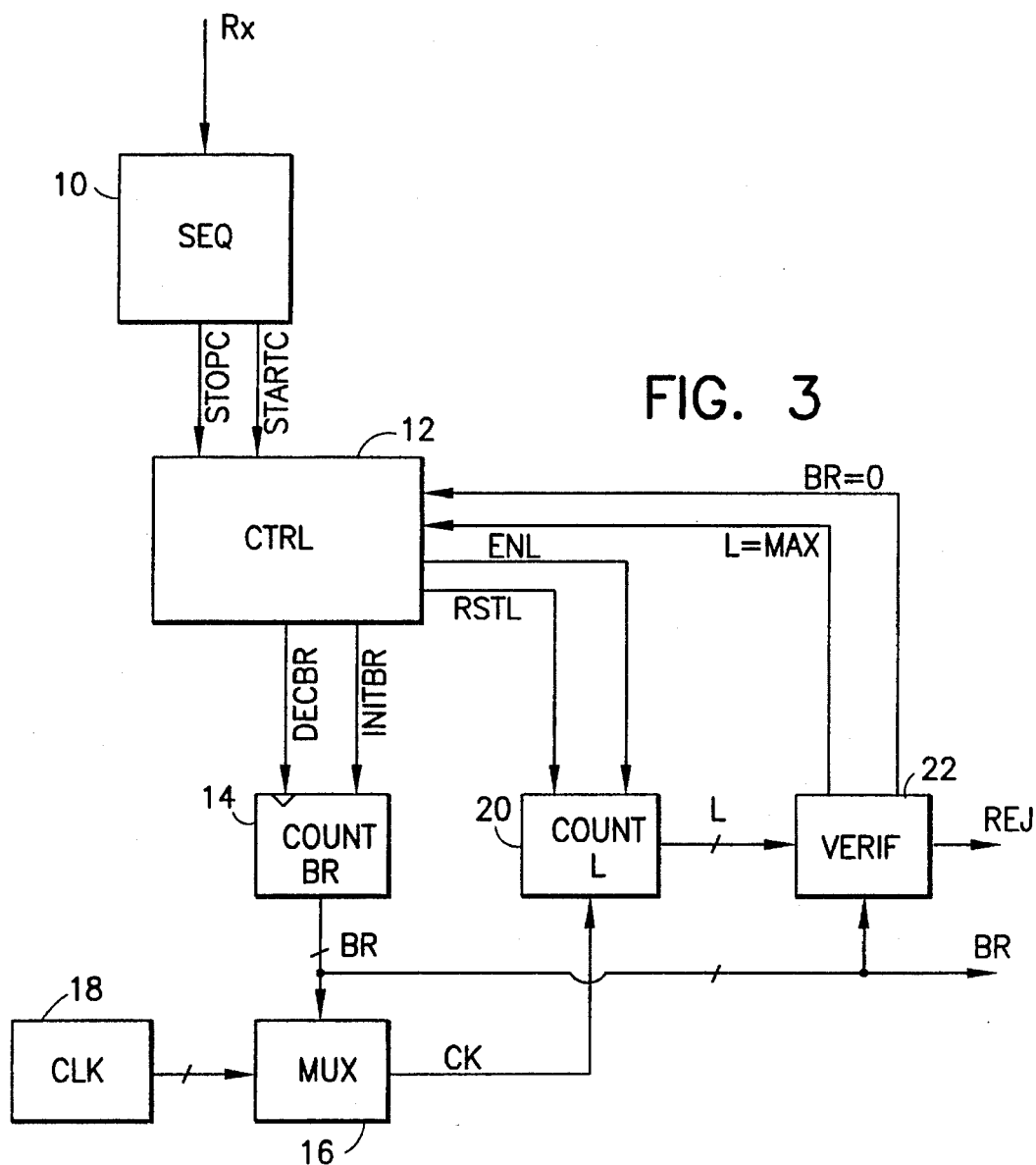
FIG. 3 is a block diagram of a first embodiment of the frequency-identification circuit embodying the invention.

FIG. 3 is a block diagram of a circuit employing a counter that is used in the above-mentioned way to implement the frequency-identification method. A sequencer 10 receives signal Rx whose nominal frequency is to be identified. Sequencer 10 provides a start pulse STARTC and a stop pulse STOPC to a control circuit 12 upon the occurrence of a first edge and a second edge, respectively, of signal Rx. The first and second edges are, for example, two successive edges having the same direction determining a period of signal Rx, or a measurement interval. The two edges could also be two successive edges of opposite direction determining a half-period, or two edges having the same direction and separated from each other by several periods. An exemplary more sophisticated sequencer is described in more detail hereinafter.

The control circuit 12 provides an initialization signal INITBR and a decrement signal DECBR to a counter 14 whose content, hereinafter referred to as selection data BR, selects an associated channel of a multiplexer 16.

A clock generator 18 provides to multiplexer 16 a plurality of clock signals having various frequencies. Each clock signal corresponds to one of the pulse trains mentioned in relation to FIG. 2 and is therefore associated with one of the possible nominal frequencies of signal Rx. Thus, data BR indicates the nominal frequency associated with the clock signal selected by multiplexer 16. The selection data BR is initialized at its maximum value when signal INITBR is set. The decreasing values of data BR select, in multiplexer 16, clock signals having decreasing frequencies from the clock generator 18. The selected clock signal CK is provided to the counting input of a counter 20 receiving from the control circuit 12 a reset signal RSTL and an enabling signal ENL (when signal ENL is set, the content of counter 20 is transferred to its output L). Counter 20 corresponds to the counter mentioned with reference to FIG. 2.

A verifier circuit 22 receives the output L of counter 20 and the selection data BR. Circuit 22, described in more detail hereinafter, is arranged to supply a signal L=MAX to the control circuit 12 when the output L of counter 20 is equal to a maximum value that is a function of data BR (and thus, of the associated nominal frequency). The maximum values correspond to the states of counter 20 at times $t_1$, $t_2$ ... of FIG. 2. Circuit 22 provides a signal BR=0 to the control circuit 12 when data BR reaches a value, for example 0, that corresponds to a non-available clock signal having too low a frequency. Finally, circuit 22 provides a rejection signal REJ when output L of counter 20 is lower than a minimum value that is also a function of data BR (and therefore, of the associated nominal frequency). The minimum values correspond to the states of counter 20 at times $t_1'$, $t_2'$ ... of FIG. 2.

Referring back to FIG. 2, the circuit of FIG. 3 schematically operates as follows. At time $t_0$, sequencer 10 provides a pulse STARTC to the control circuit 12 that thereupon initializes counter 14 (data BR) to its higher value and resets counter 20. The data BR at maximum value selects the clock signal CK having the highest frequency. Counter 20 counts clock pulses starting from zero. When the state L of counter 20 reaches a maximum value selected by data BR (one of the values at times $t'_1$, $t'_2$ ... ), the verifier circuit 22 provides a pulse L=MAX to the control circuit 12 that decrements data BR and resets counter 20. The new data BR selects a new maximum value in the verifier circuit 22 that again waits for the state of counter 20 to reach this new maximum value ... Upon the occurrence of the second falling edge of signal Rx (the end of the measurement interval), sequencer 10 provides a pulse STOPC to the control circuit 12 that freezes the state of counter 20. State L is compared with a minimum value (one of the values at times $t'_1, t'_2 \ldots$) selected by data BR in the verifier circuit 22, that sets the rejection signal REJ if value L is lower than this minimum value.

Figure 4:
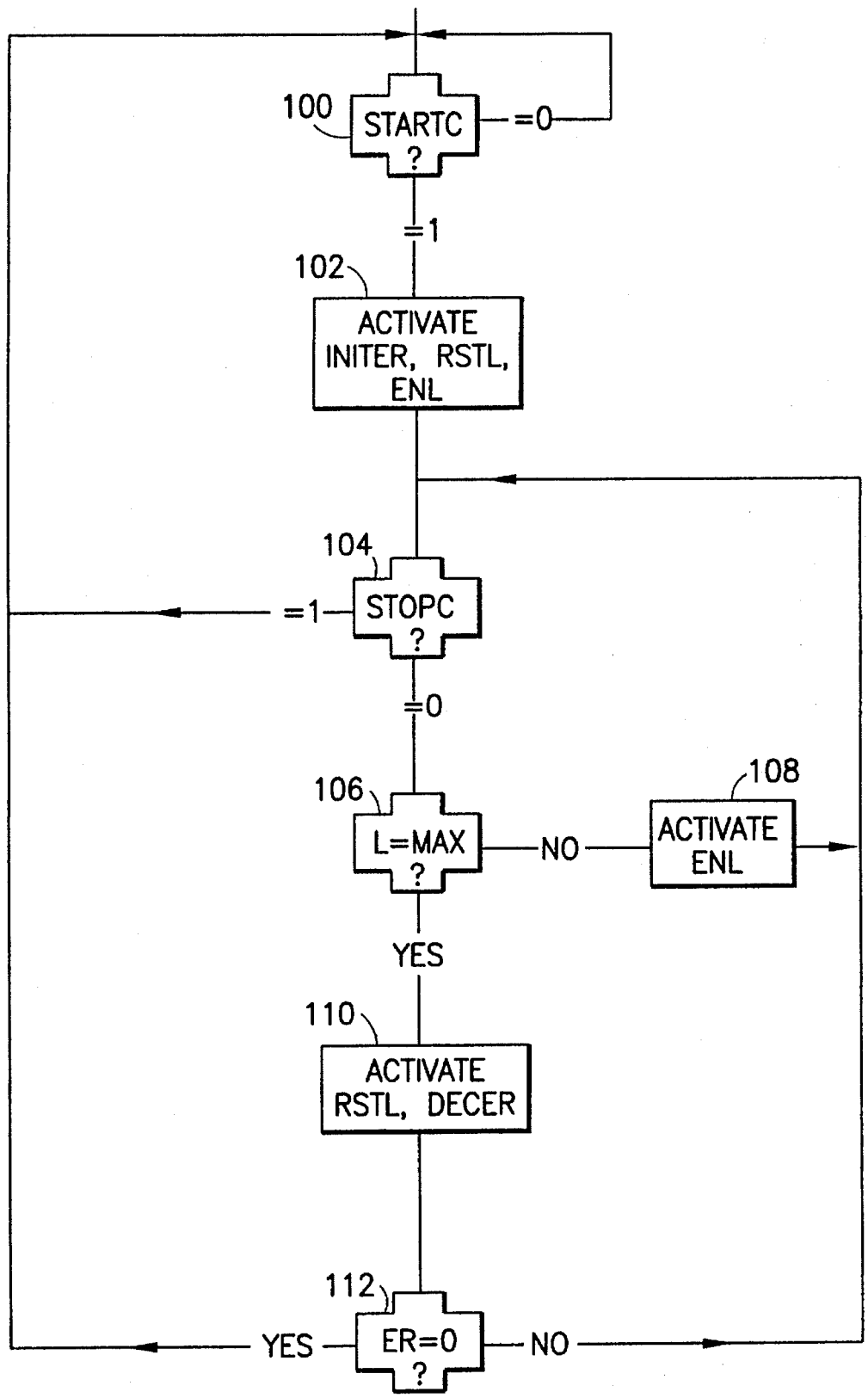
FIG. 4 is a flowchart of operations executed by a control circuit of the circuit of FIG. 3.

FIG. 4 is a flowchart of the operations executed by the control circuit 12, and facilitates an understanding the detailed operation of the circuit of FIG. 3. Hereinafter, a paragraph describing a block of the flowchart is preceded by the block number.

100. The control circuit 12 executes a loop whilst it awaits the activation of signal STARTC.

102. Signal STARTC is set (for example, at time $t_0$). Signals INITBR, RSTL and ENL are simultaneously set for respectively initializing the selection data BR at its maximum value, resetting the content of counter 20, and transferring the content L to the input of the verifier circuit 22. The initialization of data BR at its maximum value causes the selection of the clock signal CK having a maximum frequency.

104. A check is made as to whether signal STOPC is set. If yes, the frequency-identifying process is complete and the system returns to the waiting state of block 100.

106. Signal STOPC is not set. A check is made as to whether signal L=MAX is set. The purpose of this is to find out whether one of the times $t_1, t_2 \ldots$, for example, has been reached.

108. Signal L=MAX is not set. Signal ENL is set to output a possible new value L of counter 20. Execution is resumed at block 104.

The loop 104-106-108 is repeated while counter 20 is simultaneously incremented, at the rate of the selected clock signal CK.

110. The loop 104-106-108 is interrupted when signal L=MAX is set by the verifier circuit 22 indicating that one the the times $t_1, t_2, \ldots$ has been reached. Signals RSTL and DECBR are set respectively to reset counter 20 and to decrement the selection data BR in counter 14. Then, multiplexer 16 selects a new frequency, lower than the preceding frequency, of the clock signal CK, and counter 20 is incremented at the rate of this new frequency.

112. A check is made as to whether signal BR=0 is set. Signal BR=0 is set when the selection data BR reaches a lower limit value, 0, indicating that the frequency of signal Rx is too low to be determined. If yes, the control circuit 12 goes to its waiting state at block 100. If not, execution returns to the loop. 104-106-108 where the content L of counter 20 is again incremented.

Once the setting of signal STOPC is detected at block 104, the circuit goes into an inactive waiting mode at block 100. The output L of counter 20 is frozen. Data BR is also frozen and indicates the nominal frequency of signal Rx. The rejection signal REJ provided by the verifier circuit 22 indicates that the nominal frequency is unknown if value L provided by counter 20 has not reached the minimum value associated with the present data BR, or if data BR has reached its lower limit (at block 112).

Figure 5:
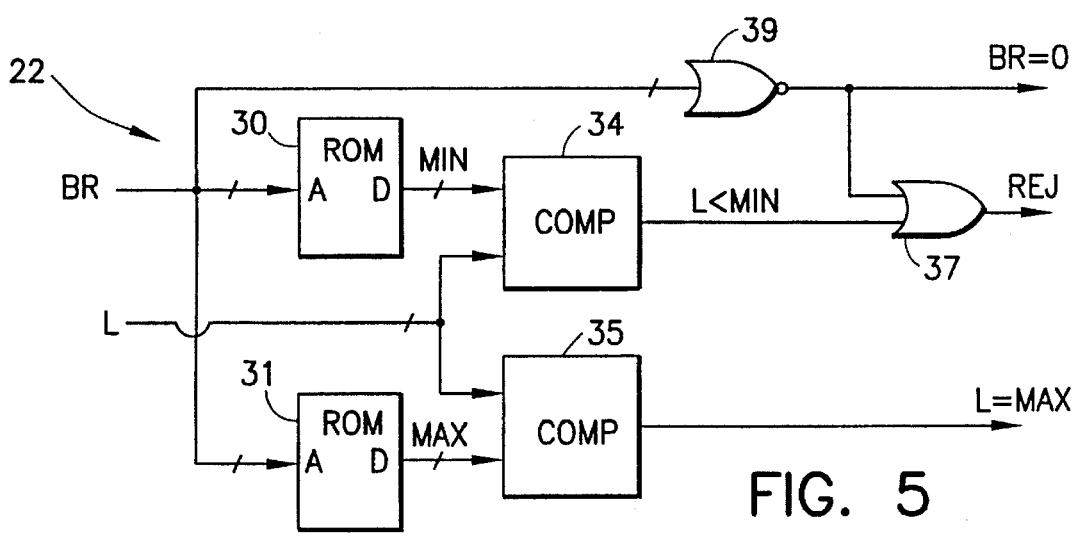
FIG. 5 represents in more detail elements of one of the blocks of the circuit of FIG. 3.

FIG. 5 represents an embodiment of the verifier circuit 22 adapted to a general case. The selection data BR is provided to the address inputs of two ROMs 30 and 31. ROM 30 provides to a comparator 34, for each value of data BR, a minimum associated value MIN. ROM 31 provides to a comparator 35, for each value of data BR, a maximum associated value MAX. Each comparator 34 and 35 further receives the value L provided by counter 20. Comparator 34 provides an active signal when value L is lower than the value MIN provided by ROM 30. Comparator 35 provides signal L=MAX when value L is equal to the value MAX provided by ROM 31. The output of comparator 34 is connected to an input of an OR gate 37 providing the error signal REJ. Each bit of data BR is further provided to an input of a NOR gate 39 whose output, providing signal BR=0, is connected to the second input of gate 37.

With this configuration, it is possible to associate with each value of data BR, and therefore with each nominal speed, minimum and maximum limits for a tolerable error range for the measurement interval.

The clock frequencies are chosen so that the ratios between each nominal frequency and the associated clock frequency are equal. An advantage of this choice of clock frequencies is that the clock frequency provided at the end of the process may serve, as will be seen hereinafter, to directly synchronize a circuit that needs to be synchronized with the desired nominal frequency. A further advantage of this choice is that all the limit values are of the same order of magnitude. If the progression of the nominal speeds is geometric, all the limit values are also equal for nominal speeds lower than the highest value, as shown in FIG. 2 for speeds from 460800 to 57600 and for speeds lower than 38400.

In the example of FIG. 2, there are only three minimum values, 14, 5 and 3, and three corresponding maximum values 18, 9 and 6, to be stored. To store such a small number of values, ROMs 30 and 31 can be replaced with a logic circuit providing the desired values by decoding data BR, thus simplifying the system.

Figure 6:
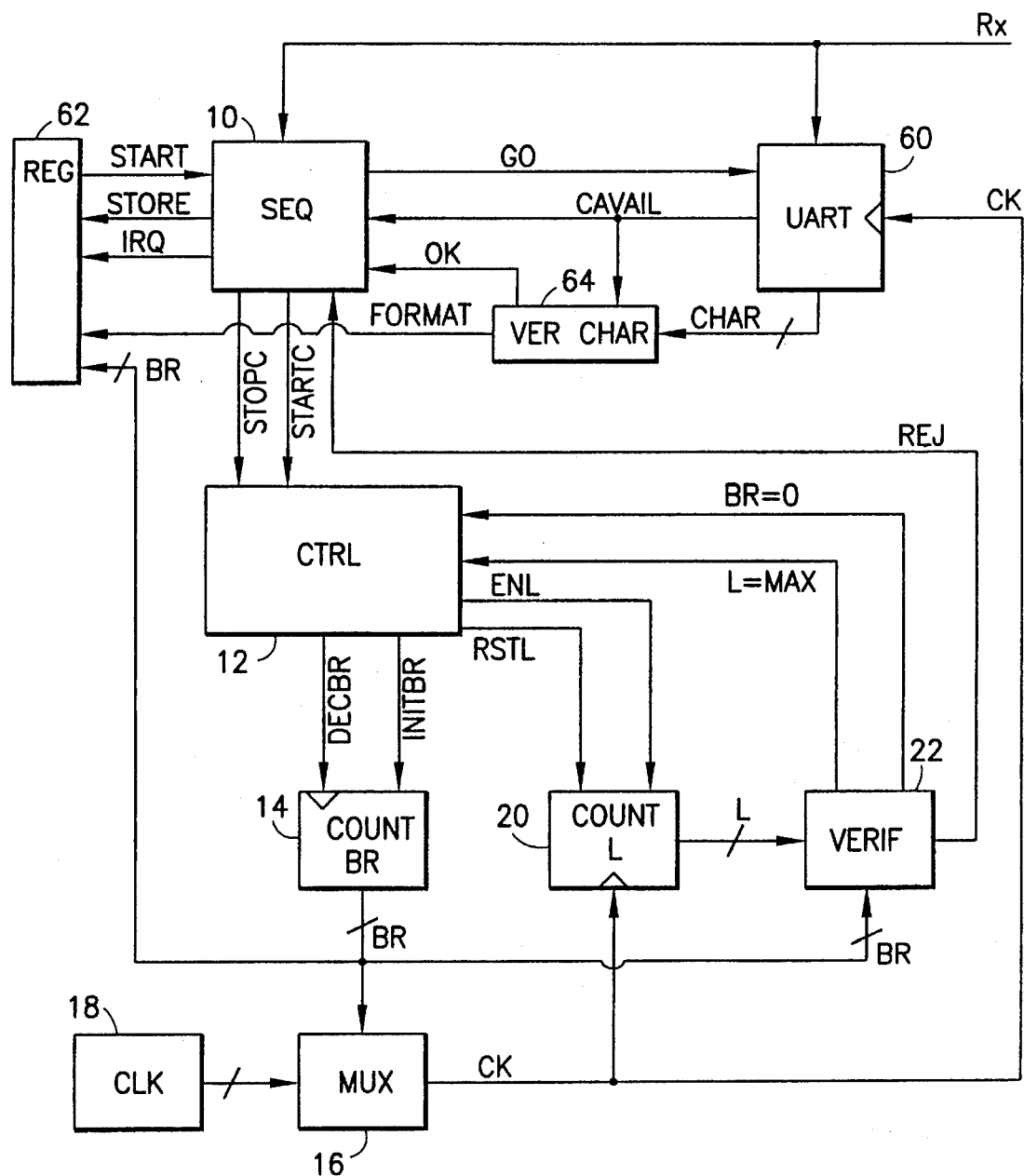
FIG. 6 is a block diagram of a receiver/transmitter circuit embodying the invention, that is self-adapting to the transmission speed of a serial line.

FIG. 6 represents an application of the circuit of FIG. 3 to a receiver/transmitter circuit that is self-adapting to the transmission speed of a serial line. All the elements of FIG. 3 are represented, and labeled with same references. The identification circuit of FIG. 3 is associated with a UART circuit 60 that receives signal Rx and is clocked by the clock signal CK provided by multiplexer 16. Sequencer 10 executes additional operations, described hereinafter, with respect to the sequencer of FIG. 3. Sequencer 10 receives the rejection signal REJ from the verifier circuit 22 and has an associated register 62 that is accessed by a microprocessor bus (not shown). The enabling of a bit START of register 62 indicates to sequencer 10 that an adaptation sequence is to be started. At the end of the adaptation sequence, sequencer 10 provides a signal STORE to register 62 causing the storage in the register of the selection data BR, and enables an interruption bit IRQ of the register so that the microprocessor may read the results and store the measured characteristics of line Rx.

Figure 1:
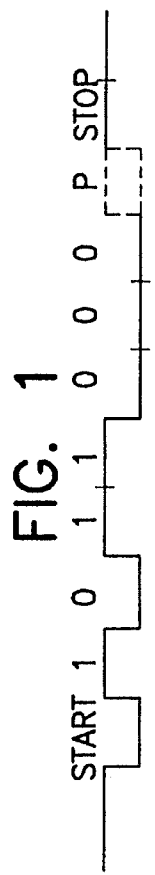
FIG. 1 above described, represents the waveform of a serial transmission signal of a specific character that is conventionally transmitted to allow a receiving circuit to determine the transmission speed.

The UART 60 receives a signal CO from sequencer 10 for starting the acquisition of a character on line Rx. When a character is acquired, the UART enables a signal CAVAIL and provides the character on lines CHAR. Lines CHAR and signal CAVAIL are provided to a character checking circuit 64 that provides to sequencer 10 a signal OK if the character present on lines CHAR corresponds to a prestored character. Circuit 64 simultaneously sets the state of a line FORMAT to indicate the parity format of the transmission on line Rx, that is, (refer to FIG. 1), whether 8 bits of the characters are transmitted, or only 7 bits plus a parity bit P; the state of the line FORMAT is stored in register 62 simultaneously with the selection data BR.

Figure 7:
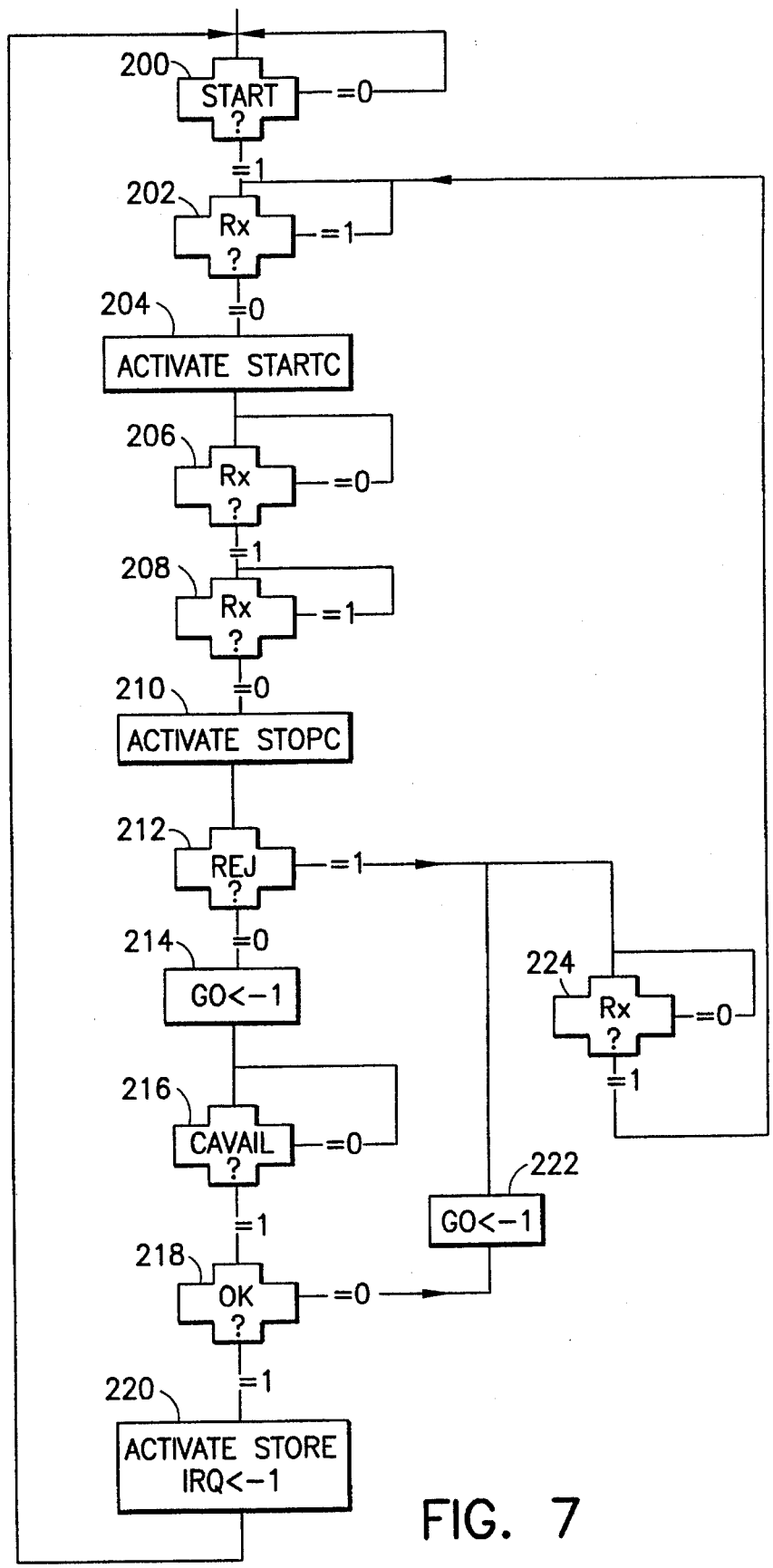
FIG. 7 is a flowchart of operations executed by a sequencer of the circuit of FIG. 6.

FIG. 7 is a flowchart of the operations executed by the sequencer 10 of the circuit of FIG. 6, an :facilitates an understanding the operation of the circuit.

200. The sequencer waits for the setting of bit START; this bit is set by the microprocessor, for example when a user indicates that a new terminal is connected to line Rx.

202. Bit START is set. The sequencer waits for a falling edge on line Rx, corresponding to the occurrence of a start bit for the transmission of a character (for example, all time $t_0$ of FIG. 2).

204. A pulse is provided on the start line STARTC prompting the control circuit 12 to start a frequency identification sequence.

206. The sequencer waits for the occurrence of a rising edge of signal Rx.

208. When the rising edge occurs, the sequencer waits for the next falling edge of signal Rx.

210. When this falling edge occurs, the sequencer provides a pulse STOPC to the control circuit 12 to stop the frequency identification sequence.

At this moment, the frequency identification circuit has executed the steps described with relation to FIG. 4. The frequency of signal CK, controlling the UART, is, except in the error conditions indicated by signal REJ, the frequency associated with the desired nominal speed.

212. A check is made as to whether the rejection signal REJ is set. The purpose is to know whether the second falling edge has duly occurred within a tolerable error range, that is, whether the present frequency of the clock signal CK is appropriate.

214. Signal REJ is not set indicating an a priori valid transmission speed has been found. The signal GO for starting UART is set to an active state (1). The UART is thus theoretically set up and waits for a transmission start bit (START) before acquiring the eight following bits at the speed established by its clock signal, in the present case by the present signal CK. If the character transmitted to line Rx is the usual character CR provided to identify the speed (FIG. 1), the UART identifies the second bit of this character as being the start bit and starts acquiring the eight following bits 11000,P, STOP, and 1.

216. The sequencer waits for the setting of line CAVAIL indicating that eight bits of a character have been acquired by the UART.

218. The eight bits of the character have been acquired by the UART, and are provided at the input of the checking circuit 64 enabled by signal CAVAIL. The checking circuit 64 compares the eight bits with two possible desired values, one without a parity bit 11000011, the other with a parity bit 11000111. If the acquired bits correspond to one of these values, signal OK is set and the line FORMAT is set to a state, for example the state of the parity bit, indicating that the transmission is executed with or without a parity bit.

220. Signal OK is set. The UART is set to the suitable transmission speed. The results found (the speed provided by data BR, the parity provided by line FORMAT) are stored in register 62 by the setting of line STORE. An interruption bit IRQ is enabled to cause the microprocessor to store the results found. The sequencer then returns to the waiting mode, waiting for a new setting to 1 of bit START at block 200.

222. The character acquired by the UART does not correspond to a desired character. This may be due to a wrong identification character having been transmitted, or a wrong transmission speed having been identified.

224. The system waits until line Rx returns to its stand-by state, that is, state 1, and waits for the next transmission of a character to block 202. The same operation is executed if, at block 212, the error signal REJ is set, that is, if the transmission frequency is unknown.

If signal BR=0 is set between blocks 204 and 210, causing setting of signal REJ, either the transmission speed is too low, or signal Rx is constantly in an unexpected state. When an adequate state of signal Rx is re-established, execution is continued by checking signal REJ at block 212 and waiting, at block 224, for the next rising edge of line Rx.

With a self-adapting circuit such as the one described in FIG. 6, it is possible to detect transmission speeds as high as 921600 bits/second, or even more if the technology of the circuits makes it possible; in contrast with conventional software solutions, it is not possible to detect speeds higher than 19200 bits/second without running the risk of inadequately controlling all the existing serial connections.

Sequencer 10 and the control circuit 12 can be easily fabricated by those skilled in the art with the aid of the corresponding flowcharts. More particularly, the flowcharts can be directly transcribed in an advanced logic circuit description language, such as the VHDL, that allows direct programming of logic circuits such as PALs.

As is apparent to those skilled in the art, various modifications can be made to the above disclosed preferred embodiments, more particularly to the flowcharts that can be differently established while providing the same functions.

Although an application of the invention to transmission on serial lines has been described, the invention applies to any cases when it is necessary to identify a frequency amongst several possible discrete frequencies, whatever be the variations of the discrete frequencies one with respect to the others.

In the foregoing description, it is assumed that the transmission of the $i+1^{th}$ pulse train starts at the maximum time $t_i$ ($i=0, 1, 2, \ldots$). In fact, all that is required is that the change-over between clock pulse trains does not occur during the interval $t_i'$ to $t_i$ when the measurement time interval can validly terminate in respect of a logic signal at the $i^{th}$ discrete frequency; if this condition is observed, the clock pulse train frequency at the end of the measurement interval can be used as an indication of the nominal frequency of the logic signal.

Thus, for example, the transmission of the $i+1^{th}$ pulse train could be started at the time $t_1'$; in this case, if the end of the measurement interval occurs during the transmission of the $j^{th}$ pulse train ($j=1, 2, \ldots$), the desired nominal frequency is the $j-1^{th}$ instead of the $j^{th}$ frequency (it will be appreciated that with this arrangement the first pulse train serves no purpose other than to time the interval $t_1'$, which can, of course, be done in other ways—it is therefore equally valid to view the pulse train starting at $t_1'$ as the first pulse train in which case the desired nominal frequency is the $j^{th}$ frequency). In any event, a final check should be made that the end of the measurement interval occurred in the current pulse train before the time $t_j$.

With the foregoing arrangement of starting a new pulse train at the minimum time $t_i'$, it is still only necessary to store in verifier 22 two count values for each pulse train, these being values corresponding to time $t_i$ and $t_{i+1}'$. However, if the change-over between pulse trains is effected at some time intermediate times $t_i$ and $t_{i+1}'$, then it will be necessary to store three counts for each pulse train, that is, counts corresponding to $t_i$, $t_{i+1}'$ and the desired change-over time (prior to $t_{i+1}'$).

Whilst it is preferred that the ratio between the frequency of each clock pulse train and the associated discrete nominal frequency is the same for all pulse trains, it will be appreciated that this is not necessary as any differences in this ratio are simply reflected in the count values stored in the verifier 22.

I claim:

1. A method of identifying a nominal frequency of a logic signal that may have a frequency equal, with a possible error, to one of n discrete frequencies of progressively decreasing value from a first to an $n^{th}$ frequency, said possible error having, for each said discrete frequency, a predetermined allowable range defined by maximum positive and negative error values, said method being implemented during a measurement period established by two predetermined edges of the logic signal, said method including the following steps:

a) to an extent permitted by a duration of said measurement period, sequentially transmitting trains of clock pulses, with each successive clock pulse train being of a lesser frequency than its predecessor and having a respective predetermined time duration, predetermined time durations of the trains of clock pulses being such that:

(i) a total duration of the trains of clock pulses from a first to an $i^{th}$ pulse train, for $0<i<n$, is at least as great as a duration of the measurement period that would result if the logic signal having $i^{th}$ discrete frequencies decreased by a corresponding maximum negative error value, but is less than the duration of the measurement period that would result if the logic signal having an $(i+1)^{th}$ discrete frequency increased by a corresponding maximum positive error value, (ii) a total duration of the pulse trains from a first to an $n^{th}$ pulse train is at least as great as a duration of the measurement period that would result if the logic signal having an $n^{th}$ discrete frequency decreased by the corresponding maximum positive error value, b) at an occurrence of a second of predetermined said edges, taking an indication of a then current clock frequency as an indication of the nominal frequency of the logic signal.

2. A method according to claim 1, wherein time durations of said clock pulse trains are such that a sum of time durations of the first of the $i^{th}$ trains of clock pulse trains, for $0<i\leq n$, is substantially equal to the duration of the measurement period that would result in the case of the logic signal having a frequency equal to the $i^{th}$ discrete frequency decreased by the corresponding maximum negative error value.

3. A method according to claim 2, further including the step of indicating that the nominal frequency of the logic signal is unknown if the second of said edges does not occur before an end of transmission of an $n^{th}$ clock pulse train.

4. A method according to claim 2, further including the step of indicating that the nominal frequency of the logic signal is unknown if, when the second of said edges occurs during the $i^{th}$ pulse train, for $0<i\leq n$, the duration of the actual measurement period is less than the duration of the measurement period that would result in the case of the logic signal having a frequency equal to the $i^{th}$ discrete frequency increased by the corresponding maximum positive error value.

5. A method according to claim 1, wherein a ratio of the value of the $i^{th}$ discrete frequency to the frequency value of the $i^{th}$ clock pulse train is the same for all values of i for $0<i<n$.

* * * * *